(12) United States Patent
Xu et al.

(10) Patent No.: US 10,894,889 B2
(45) Date of Patent: Jan. 19, 2021

(54) AQUEOUS COATING COMPOSITION AND PROCESS OF MAKING THE SAME

(71) Applicant: Dow Global Technologies LLC, Midland, MI (US)

(72) Inventors: Yawei Xu, Shanghai (CN); Biao Shen, Shanghai (CN); Xiaohong Yang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 506 days.

(21) Appl. No.: 15/533,666

(22) PCT Filed: Dec. 19, 2014

(86) PCT No.: PCT/CN2014/094337
§ 371 (c)(1),
(2) Date: Jun. 7, 2017

(87) PCT Pub. No.: WO2016/095196
PCT Pub. Date: Jun. 23, 2016

(65) Prior Publication Data
US 2017/0313899 A1   Nov. 2, 2017

(51) Int. Cl.
| | |
|---|---|
| *C09D 7/61* | (2018.01) |
| *C09D 7/63* | (2018.01) |
| *B05D 3/00* | (2006.01) |
| *B27K 3/12* | (2006.01) |
| *B27K 5/02* | (2006.01) |
| *C09D 5/02* | (2006.01) |
| *C09D 133/00* | (2006.01) |
| *C09D 133/08* | (2006.01) |
| *C09D 133/14* | (2006.01) |
| *C08K 3/36* | (2006.01) |
| *C08K 5/17* | (2006.01) |

(52) U.S. Cl.
CPC ............... *C09D 7/61* (2018.01); *B05D 3/007* (2013.01); *B27K 3/12* (2013.01); *B27K 5/02* (2013.01); *C09D 5/024* (2013.01); *C09D 7/63* (2018.01); *C09D 133/00* (2013.01); *C09D 133/08* (2013.01); *C09D 133/14* (2013.01); *C08K 3/36* (2013.01); *C08K 5/17* (2013.01); *C08L 2201/54* (2013.01)

(58) Field of Classification Search
CPC .......... C09D 133/14; C09D 7/65; C09D 7/61; C09D 7/63; B05D 3/007; B27K 5/02; C08K 3/36; C08K 5/17
USPC .......................................................... 524/543
See application file for complete search history.

(56) References Cited

U.S. PATENT DOCUMENTS

| | | | |
|---|---|---|---|
| 2,630,410 | A | 3/1953 | Clapsadle et al. |
| 4,584,340 | A | 4/1986 | Chi |
| 5,368,833 | A | 11/1994 | Johansson et al. |
| 6,080,339 | A | 6/2000 | Fleming et al. |
| 6,927,251 | B2 | 8/2005 | Rische et al. |
| 7,629,403 | B2 | 12/2009 | Campbell |
| 9,598,557 | B2 | 3/2017 | Wang et al. |

FOREIGN PATENT DOCUMENTS

| | | | |
|---|---|---|---|
| CN | 102190936 A | * | 9/2011 |
| CN | 102190936 A | | 9/2011 |
| CN | 102408826 A | | 4/2012 |
| GB | 1491366 A | | 11/1977 |
| JP | 04491313 | | 6/2010 |
| WO | WO-2013056464 A1 | * | 4/2013 |

OTHER PUBLICATIONS

International Preliminary Report on Patentability for International Application PCT/CN2014/094337; International Filing Date Dec. 19, 2014; dated Jun. 20, 2017; 4 pages.
International Search Report; International APplication No. PCT/CN2014/094331; International Filing Date Dec. 19, 2014; dated Sep. 6, 2015; 3 pages.
Written Opinion of the International Searching Authority; International Application No. PCT/CN2014/094337; International Filing Date Dec. 19, 2014; dated Sep. 6, 2015; 3 pages.
Iler, K. Ralph; The Chemistry of Silica; John Wiley & Sons (1979) pp. 407-409.

* cited by examiner

*Primary Examiner* — Ling Siu Choi
*Assistant Examiner* — Ronald Grinsted
(74) *Attorney, Agent, or Firm* — Karl E. Stauss; Cantor Colburn LLP

(57) ABSTRACT

An aqueous coating composition includes, based on the total weight of the aqueous coating composition, (a) an aqueous polymer dispersion present in an amount of from 15% to 33% by solids weight, wherein the polymer includes at least 95% by solids weight of an acrylic emulsion copolymer based on the solids weight of the polymer; (b) anionic colloidal silica present in an amount of from 1% to 13% by solids weight; (c) a solvent present in an amount of from 0.5% to 9% by weight, wherein the solvent has at least one hydroxyl group and a dielectric constant at 25° C. of from 7 to 10.3; (d) a monoamine compound present in an amount of from 0.2% to 1.5% by weight, wherein the monoamine compound is selected from an alkyl monoamine, a beta-hydroxyl monoamine containing up to 2 hydroxyl groups, or mixtures thereof; and (e) water.

13 Claims, 2 Drawing Sheets

AQUEOUS COATING COMPOSITION AND PROCESS OF MAKING THE SAME

FIELD OF THE INVENTION

The present invention relates to an aqueous coating composition and a process of making the same.

INTRODUCTION

Matt coating films are coating films having low gloss, normally at a level of below 30 on a 60° Gardner Gloss scale. In the wood coating industry, it is more desirable to provide a substrate with an even lower gloss finish. The gloss of coating films is directly related to their micro-scale surface roughness. Use of microfillers including conventional matting agents and pigments can increase the microscale surface roughness of coating films and decrease their gloss. To achieve low gloss, typically at least 3-4% microfillers, by solids weight of the coating compositions, are added into the coating composition. Such high dosage of microfillers, however, usually results in undesirably low clarity of coating films. Many coating applications require coating films having a clarity value of 40% or higher.

Therefore, it is desirable to provide a coating composition that provides coating films with balanced properties of low gloss and high clarity.

SUMMARY OF THE INVENTION

The present invention provides a novel aqueous coating composition that provides coating films with both low gloss and high clarity. Such aqueous coating composition is a novel combination of an acrylic emulsion copolymer, anionic colloidal silica, a specific solvent, and a specific monoamine compound. The coating composition provides a matt coating film without the use of conventional microfillers. The coating film shows a gloss level of 20 or lower on a 60° Gardner Gloss scale and a clarity value of 40% or higher.

In a first aspect, the present invention is an aqueous coating composition comprising, based on the total weight of the aqueous coating composition, (a) an aqueous polymer dispersion present in an amount of from 15% to 33% by solids weight, wherein the polymer comprises at least 95% by solids weight of an acrylic emulsion copolymer based on the solids weight of the polymer;

(b) anionic colloidal silica present in an amount of from 1% to 13% by solids weight;

(c) a solvent present in an amount of from 0.5% to 9% by weight, wherein the solvent has at least one hydroxyl group and a dielectric constant at 25° C. of from 7 to 10.3;

(d) a monoamine compound present in an amount of from 0.2% to 1.5% by weight, wherein the monoamine compound is selected from an alkyl monoamine, a beta-hydroxyl monoamine containing up to 2 hydroxyl groups, or mixtures thereof; and (e) water.

In a second aspect, the present invention is an aqueous coating composition comprising, based on the total weight of the aqueous coating composition, (a) an aqueous polymer dispersion present in an amount of from 18% to 31% by solids weight, wherein the polymer comprises at least 95% by solids weight of an acrylic emulsion copolymer based on the solids weight of the polymer;

(b) anionic colloidal silica present in an amount of from 1.5% to 11% by solids weight, wherein silica particles in the anionic colloidal silica have a specific surface area of from 80 to 500 m$^2$/g;

(c) a solvent present in an amount of from 1% to 4% by weight, wherein the solvent has at least one hydroxyl group and a dielectric constant at 25° C. of from 7 to 10.3;

(d) a monoamine compound present in an amount of from 0.7% to 1% by weight, wherein the monoamine is selected from an alkyl monoamine, a beta-hydroxyl monoamine containing up to 2 hydroxyl groups, or mixtures thereof; and (e) water.

In a third aspect, the present invention is a process of preparing the aqueous coating composition of the first or second aspect. The process comprises admixing: (a) the aqueous polymer, (b) the anionic colloidal silica, (c) the solvent, (d) the monoamine compound, and (e) water.

In a fourth aspect, the present invention is a method of imparting both low gloss and high clarity to a substrate. The method comprises:

forming the aqueous coating composition of the first or second aspect, applying the aqueous coating composition to a substrate, and drying the applied coating composition to form a coating;

wherein the coating has a gloss level of 20 or less on a 60° Gardner Gloss scale and a clarity value of 40% or higher.

DETAILED DESCRIPTION OF THE INVENTION

Figure 1:
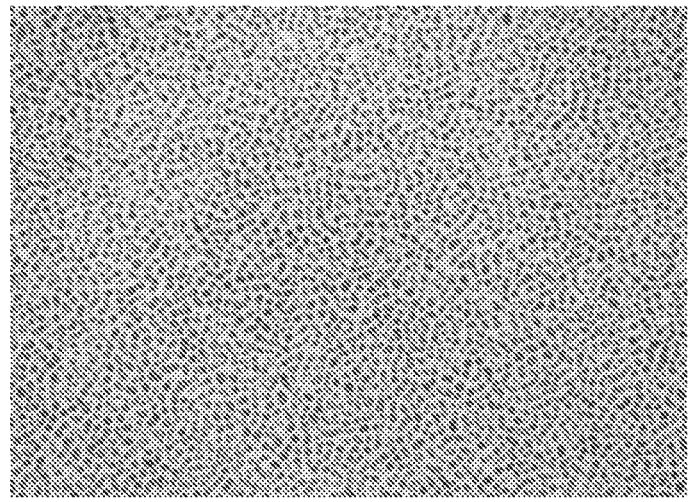
FIG. 1 is an optical microscopy image (reflective mode) of the surface of coating films obtained from one embodiment of a coating composition described herein.

The aqueous coating composition of the present invention comprises one or more aqueous polymer dispersions. The polymer may comprise at least 95% by solids weight of an acrylic emulsion copolymer based on the total solids weight of the polymer. "Acrylic" in the present invention includes (meth)acrylic acid, (meth)alkyl acrylate, (meth)acrylamide, (meth)acrylonitrile and their modified forms such as (meth)hydroxyalkyl acrylate. In some preferred embodiments, the polymer comprises, based on the total solids weight of the polymer, at least 96%, at least 97%, at least 98%, at least 99%, or even 100% by solids weight of the acrylic emulsion copolymer.

The acrylic emulsion copolymer useful in the present invention may comprise, as copolymerized units, one or more ethylenically unsaturated nonionic monomers. "Nonionic monomers" herein refer to monomers that do not bear an ionic charge between pH=1-14. Examples of suitable ethylenically unsaturated nonionic monomers include (meth)acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, hydroxypropyl methacrylate or mixtures thereof; and (meth)acrylonitrile. Other suitable nonionic monomers may be further added, for example, styrene and substituted styrene, or other vinyl monomers such as vinyl acetate, vinyl butyrate, vinyl versatate and other vinyl esters, vinyl chloride, vinylidene chloride or mixtures thereof. In some preferred embodiments, the ethylenically unsaturated nonionic monomers comprise from 60% to 98% by weight of (meth) acrylic ester monomers, based on the total weight of the ethylenically unsaturated nonionic monomers.

The acrylic emulsion copolymer useful in the present invention may comprise, based on the weight of the acrylic emulsion copolymer, 70% by weight or more of the copolymerized nonionic monomer, 75% by weight or more, or even 80% by weight or more, and at the same time, 99% by weight or less, 95% by weight or less, or even 90% by weight or less.

The acrylic emulsion copolymer useful in the present invention may comprise, as copolymerized units, one or more ethylenically unsaturated anionic monomers. "Ethylenically unsaturated anionic monomers" include, for example, polymerizable acids, anhydrides, and the metal ion (for example, Li, Na, K, Ca) and ammonium ion salts thereof. Examples of suitable polymerizable ethylenically unsaturated anionic monomers include acrylic acid, methacrylic acid, itaconic acid, phosphorus acid monomers like dihydrogen phosphate monomers including 2-phosphoethyl (meth)acrylate, vinyl phosphonic acid, and allyl phosphonic acid; fumaric acid; maleic acid; monomethyl itaconate; monomethyl fumarate; monobutyl fumarate; maleic anhydride; 2-acrylamido-2-methyl-1-propanesulfonic acid; sodium salt of 2-acrylamido-2-methyl-1-propanesulfonic acid; ammonium salt of 2-acrylamido-2-methyl-1-propane sulfonic acid; sodium vinyl sulfonate; sodium salt of allyl ether sulfonate; and mixtures thereof. In some preferred embodiments, acrylic acid, methacrylic acid, itaconic acid, 2-phosphoethyl methacrylate, or a mixture thereof is used as the ethylenically unsaturated anionic monomer. The acrylic emulsion copolymer useful in the present invention may comprise, based on the weight of the acrylic emulsion copolymer, 0.1% by weight or more of the copolymerized ethylenically unsaturated anionic monomer, 0.5% by weight or more, or even 1% by weight or more, and at the same time, 20% by weight or less, 10% by weight or less, or even 5% by weight or less.

The acrylic emulsion copolymer useful in the present invention may further comprise, as copolymerized units, one or more ethylenically unsaturated monomers having one or more functional groups as self-crosslinking agents. The functional groups may be selected from carbonyl, acetoacetate, alkoxysilane, ureido, amide, imide, amino group, or mixtures thereof. Examples of suitable monomers include, for example, diacetone acrylamide (DAAM), acetoacetoxyethyl (meth)acrylate, acetoacetoxypropyl (meth)acrylate, acetoacetoxybutyl (meth)acrylate, 2,3-di(acetoacetoxy) propyl (meth)acrylate, allyl acetoacetates, vinyl acetoacetates, acetoacetamides of formula (I):

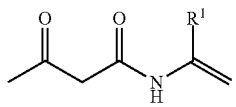

wherein $R^1$ is H or methyl, or combinations thereof. Preferably, an ethylenically unsaturated monomer bearing a carbonyl group such as DAAM or acetoacetoxyethyl (meth) acrylate is used as the self-crosslinking agent. The acrylic emulsion copolymer useful in the present invention may comprise, based on the weight of the acrylic emulsion copolymer, 0.1% by weight or more of the copolymerized functional-group-containing ethylenically unsaturated monomer, 0.5% by weight or more, or even 1% by weight or more, and at the same time, 20% by weight or less, 10% by weight or less, or even 5% by weight or less.

In some embodiments, the acrylic emulsion copolymer useful in the present invention may be a multistage polymer. The multistage polymer may comprise:

(A) a polymer A comprising as polymerized units, based on the weight of the polymer A, (a1) from 75% to 92% by weight of a (meth)acrylic acid alkyl ester having a $C_1$ to $C_2$ alkyl group including, for example, methyl (meth)acrylate, ethyl (meth)acrylate, or mixtures thereof;

(a2) from 2.1% to 10% by weight of the self-crosslinking agent described above including, for example, the carbonyl-containing functional monomer such as DAAM; and (a3) from 5% to 15% by weight of an acid monomer comprising from 4% to 14% by weight of an a, O-ethylenically unsaturated carboxylic acid including, for example, (meth)acrylic acid, itacolic acid, fumaric acid, or mixtures thereof; and from 1% to 9% by weight of a phosphorous-containing acid monomer including, for example, phospho-alkyl (meth)acrylates such as phosphoethyl (meth)acrylate, phosphopropyl (meth)acrylate, phosphobutyl (meth)acrylate, salts thereof, or mixtures thereof; and (B) a polymer B comprising as polymerized units, based on the weight of the polymer B, (b1) from 81% to 99% by weight of a hydrophobic monomer selected from a vinyl aromatic monomer including, for example, styrene or substituted styrene; a hydrophobic (meth)acrylic acid alkyl ester including, for example, butyl (meth)acrylate, iso-butyl (meth)acrylate, 2-ethylhexyl acrylate, lauryl (meth)acrylate, or stearyl (meth)acrylate; or mixtures thereof;

(b2) from 0.8% to 10% by weight of self-crosslinking agent described above including, for example, the carbonyl-containing functional monomer such as DAAM; and (b3) from 0 to 15% by weight of a hydrophilic monomer including, for example, methyl (meth)acrylate, ethyl (meth) acrylate, or mixtures thereof.

"Hydrophobic" monomer herein refers to a monomer that has a Hansch value $\geq 2.20$. "Hydrophilic" monomer herein refers to a monomer that has a Hansch value <2.20, Hansch values may be determined by the method described by A. J. Leo in Chem. Rev., 93(4):1281-1306 (1993). The polymer A may have a number average molecular weight ($M_n$) of from 3,000 to 100,000. The polymer B may have a glass transition temperature ("$T_g$") at least 40° C. lower than that of the polymer A. The weight ratio of the polymer A to the polymer B may be from 25:75 to 50:50.

$M_n$ herein may be determined by Gel Permeation Chromatography (GPC) analysis or calculated as follows, $$M_n = [W(\text{monomer}) + W(\text{CTA})]/\text{Mole}(\text{CTA}),$$

wherein W(monomer) is the total weight of monomers used in preparing the polymer A, W(CTA) is the total weight of the chain transfer agent used in preparing the polymer A, and Mole(CTA) is the total moles of the chain transfer agent used in preparing the polymer A.

The $T_g$ values used herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of $M_1$, and $T_g(M_2)$ is the glass transition temperature of the homopolymer of $M_2$, all temperatures being in K. The glass transition temperatures of monomers may be found, for example, in "Polymer Handbook", edited by J. Brandrup and E H Immergut, Interscience Publishers.

The aqueous polymer dispersion useful in the present invention may further comprise one or more compounds containing at least two —$NH_2$ or —NH— functionalities, or the polyfunctional carboxylic hydrazide as crosslinking agents. Examples of suitable crosslinking agents include adipic dihydrazide, sebacic dihydrazide, polyhydrazide, propylenediamine, cyclohexyldiamine, or mixtures thereof. Preferably, the polyfunctional carboxylic hydrazide is adipic dihydrazide. In some embodiments, the aqueous polymer dispersion comprises adipic dihydrazide when the copolymer comprises the polymerized units of DAAM. When present, the concentration of the crosslinking agent may be, based on the total weight of the aqueous polymer dispersion, 0.05% by weight or more, 0.2% by weight or more, or even 0.5% by weight or more, and at the same time, 10% by weight or less, 5% by weight or less, 2% by weight or less, or even 1% by weight or less.

The aqueous polymer dispersion useful in the present invention may be prepared by polymerization techniques well known in the art such as suspension polymerization or emulsion polymerization of the monomers described above. Emulsion polymerization is a preferred process. Emulsion polymerization techniques for preparing the aqueous dispersion of the copolymer particles are well known in the polymer arts, and include multiple stage polymerization processes. For each monomer, the concentration of the monomer based on the total weight of monomers used in preparing the aqueous dispersion is substantially the same as the concentration of copolymerized such monomer based on the total weight of the copolymer. The aqueous polymer dispersion may be prepared by emulsion polymerization from the monomers described above in the presence of a surfactant. These surfactants may include anionic and/or nonionic emulsifiers, for example, alkyl ethoxylated phosphate or alkylphenol ethoxylated phosphate surfactant; alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of the surfactant used is usually 0.1% to 6% by weight, based on the total weight of monomers. In some preferred embodiments, the alkyl ethoxylated phosphate or alkylphenol ethoxylated phosphate surfactant is used. Temperature suitable for emulsion polymerization processes may be lower than 100° C., in the range of from 30° C. to 95° C., or in the range of from 50° C. and 90° C. A mixture of the monomers may be added neat or as an emulsion in water. The monomer mixture may be added in one or more additions or continuously, linearly or nonlinearly, over the reaction period, or combinations thereof. The surfactant may be added prior to or during the polymerization of the monomers, or combinations thereof. A portion of the surfactant can also be added after the polymerization. In some embodiments, the process of preparing the aqueous polymer dispersion further includes adding the compound containing at least two —$NH_2$ or —NH— functionalities or the polyfunctional carboxylic hydrazide after the polymerization.

In the emulsion polymerization process, free radical initiators may be used. Examples of suitable free radical initiators include hydrogen peroxide, sodium peroxide, potassium peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers.

Redox systems comprising the above described initiators coupled with a suitable reductant may be used in the emulsion polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, glycolic acid, glyoxylic acid hydrate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used. Chelating agents for the metals may optionally be used.

In the emulsion polymerization process, one or more chain transfer agents may also be used. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. When present, the concentration of the chain transfer agent may be, by weight based on the total weight of monomers, from 0.01% to 5%, from 0.05% to 3%, or from 0.1% to 2%.

In the emulsion polymerization process, organic bases and/or inorganic bases as neutralizers may also be used. Suitable bases include ammonia, sodium hydroxide, potassium hydroxide, zinc oxide, mono-ethanolamine, triethyl amine, diethyl amine, dimethyl amine, sodium borate, potassium borate, aluminum hydroxide, or combinations thereof.

The aqueous polymer dispersion useful in the present invention may contain solids present from 30% to 70%, from 35% to 60%, or from 40% to 50%, by weight based on the total weight of the aqueous polymer dispersion. Suitable commercially available aqueous polymer dispersions may include, for example, PRIMAL™ EP-6060 aqueous polymer dispersion available from The Dow Chemical Company (PRIMAL is a trademark of The Dow Chemical Company).

The types and levels of the monomers described above may be chosen to provide the acrylic emulsion copolymer with a $T_g$ suitable for different applications. The glass transition temperature of the acrylic emulsion copolymer may be in the range of from −35° C. to 70° C., from −20° C. to 60° C., or from −10° C. to 45° C.

The aqueous polymer dispersion in the coating composition of the present invention may be present, by solids weight based on the total weight of the coating composition, in an amount of 15% or more, 18% or more, or even 20% or more, and at the same time, 33% or less, 31% or less, or even 30% or less.

The aqueous coating composition of the present invention may further comprise anionic colloidal silica. "Anionic colloidal silica" herein refers to a dispersion of anionic amorphous silicon dioxide ($SiO_2$) particles, which are typically dispersed in water, suitably in the presence of stabilizing cations such as $K^+$; $Na^+$; $Li^+$; $NH_4^+$; organic cations; primary, secondary, tertiary and quaternary amines; and mixtures thereof. The surface of the anionic colloidal silica is composed mostly of hydroxyl groups with the formula of Si—O—H. Other groups may also exist including, for example, silanediol (—Si—$(OH)_2$), silanetriol (—Si$(OH)_3$), surface siloxanes (—Si—O—Si—O—), and surface-bound water. The anionic colloidal silica usually has a pH value >7.5, >8, >8.5, or even 9 or more, and at the same time, 11.5 or less, or even 11 or less.

The anionic colloidal silica may be derived from, for example, precipitated silica, fumed silica, pyrogenic silica or silica gels, and mixtures thereof. Silica particles in the anionic colloidal silica may be modified and can contain other elements such as amines, aluminium and/or boron. Boron-modified colloidal silica particles may include those described in, for example, U.S. Pat. No. 2,630,410. Aluminium-modified colloidal silica may have an aluminum oxide ($Al_2O_3$) content of from about 0.05% to 3%, and preferably from 0.1% to 2%, by weight based on total solids weight of the anionic colloidal silica. The procedure of preparing the aluminium-modified colloidal silica is further described in, for example, "The Chemistry of Silica", by Iler, K. Ralph, pages 407-409, John Wiley & Sons (1979) and in U.S. Pat. No. 5,368,833.

Silica content of the anionic colloidal silica may be present, by weight based on the weight of the anionic colloidal silica, from 10% to 80%, from 12% to 70%, or from 15% to 60%. The silica particles in the anionic colloidal silica may have an average particle diameter ranging from about 2 to about 100 nanometers (nm), from about 3 to about 70 nm, from about 4 to about 50 nm, or from about 5 to about 40 nm. The silica particles in the anionic colloidal silica may have a specific surface area of from 20 to 800 square meters per gram ($m^2/g$), from 30 to 780 $m^2/g$, or from 50 to 750 $m^2/g$. The particle size and specific surface area of the silica particles may be measured by the methods described in the Examples section below.

The anionic colloidal silica in the aqueous coating composition may be present, by solids weight based on the total weight of the aqueous coating composition, in an amount of 1% or more, 1.2% or more, or even 1.5% or more, and at the same time, 13% or less, 11% or less, or even 10% or less. Suitable commercially available anionic colloidal silica include, for example, BINDZIL™ 215, BINDZIL 2040 and BINDZIL 40130 colloidal silica all available from Akzo Nobel, LUDOX™ AS-40 colloidal silica available from Grace; or mixtures thereof.

The aqueous coating composition of the present invention further comprises one or more solvents. The solvents useful in the present invention have at least one hydroxyl group and a dielectric constant at 25° C. of from 7 to 10.3, or from 7.5 to 10.3. Dielectric constant may be determined by the ratio of the electrical capacity of a capacitor filled with the solvent to the electrical capacity of the evacuated capacitor at 20° C.

Examples of suitable solvents include diethylene glycol monobutyl ether, ethylene glycol monobutyl ether, ethylene glycol monohexyl ether, triethylene glycol monobutyl ether, dipropylene glycol n-butyl ether, propylene glycol n-butyl ether, dipropylene glycol n-propyl ether, propylene glycol n-propyl ether, or mixtures thereof. In addition to fuse polymer particles into a continuous film under ambient condition, the solvent herein surprisingly may act as a promoter to decrease the gloss of the film. In some preferred embodiments, dipropylene glycol n-butyl ether, ethylene glycol monobutyl ether, diethylene glycol monobutyl ether, or a mixture thereof is used as the solvent. The concentration of the solvent may be, based on the total weight of the aqueous coating composition, present in an amount of 0.5% by weight or more, 1% by weight or more, or even 1.5% by weight or more, and at the same time, 9% by weight or less, 8% by weight or less, 7% by weight or less, or even 6% by weight or less.

The aqueous coating composition of the present invention further comprises one or more monoamine compounds. The monoamine compound herein refers to an amine compound having only one amino group. The monoamine compound may be used as a promoter to decrease gloss. The monoamine compound may be selected from an alkyl monoamine, a beta-hydroxyl monoamine containing up to two hydroxyl groups, or mixtures thereof. In some preferred embodiments, the beta-hydroxyl monoamine contains one hydroxyl group. The monoamine compound useful in the present invention may be a primary monoamine. The alkyl monoamine may be substituted or unsubstituted. The monoamine may be an amine containing two active hydrogen atoms on nitrogen atom and containing an aliphatic hydrocarbon having 2 to 10 carbon atoms. Examples of suitable monoamine compounds include n-butylamine, 2-amino-2-methyl-1-propanol, monoethanolamine ("2-aminoethanol"), octyl amine, cyclohexylamine, butylamine, 1-aminopropan-2-ol, or mixtures thereof. In some embodiments, n-butylamine, monoethanolamine, 2-amino-2-methyl-1-propanol, or a mixture thereof is used as the monoamine compound.

The concentration of the monoamine compound may be, based on the total weight of the aqueous coating composition, present in an amount of 0.2% by weight or more, 0.3% by weight or more, 0.5% by weight or more, and at the same time, 1.5% by weight or less, 1.2% by weight or less, or even 1.0% by weight or less.

The aqueous coating composition of the present invention may further comprise one or more thickeners. The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR. When present, the concentration of the thickener is, based on the total weight of the aqueous coating composition, generally from 0.05% to 3% by weight, from 0.1% to 2% by weight, or from 0.3% to 1% by weight.

In some embodiments, the aqueous coating composition of the present invention is substantially free of silane coupling agents. "Substantially free of silane coupling agents" herein means that the silane coupling agents are not incorporated into the coating composition; but low levels of silane coupling agents may be, for example, adventitiously introduced as impurities in defoamers, wetting agents and dispersants, added during the preparation of the anionic colloidal silica, or may be formed during the polymerization of the aqueous polymer dispersion. In any event, less than 0.3% by weight, based on the total weight of the coating composition, of silane coupling agents is present in the coating composition. "Silane coupling agents" herein refer to molecules with the structure of R—Si—(X)$_3$, wherein R is selected from vinyl, amino, chloro, epoxy, mercapto, or combinations thereof; and X is selected from methoxy, ethoxy or combinations thereof. Examples of silane coupling agents include alkyl silanes such as (3-aminopropyl) triethoxysilane, gamma-glycidoxypropyltrimethoxysilane, and ethyl triethoxysilane; epoxy silane; or mixtures thereof.

In some preferred embodiments, the aqueous coating composition of the present invention is substantially free of microfillers. "Substantially free of microfillers" as used herein means that the aqueous coating composition comprises less than 1% by weight of microfillers, based on the total weight of the coating composition. "Microfillers" refers to any organic or inorganic particles have an average particle size of from 1 to 20 microns according to the ASTM E2651-10 method. Examples of micorfillers include matting agents, pigments, fillers, or mixtures thereof. "Matting agents" herein refers to any inorganic or organic particles that provide matt effects. The matting agents may be a silica, polyurea, polyacrylate, polyethylene, or polytetrafluoroethene matting agent; or mixtures thereof. The matting agent may be in the form of powders or an emulsion.

In some preferred embodiments, the aqueous coating composition of the present invention comprises, based on the total weight of the aqueous coating composition,
(a) the aqueous polymer dispersion present in an amount of from 18% to 31% by solids weight; (b) the anionic colloidal silica present in an amount of from 1.5% to 11% by solids weight, wherein silica particles in the anionic colloidal silica have a specific surface area of from 80 to 500 m$^2$/g; (c) the solvent present in an amount of from 1% to 4% by weight, wherein the solvent has at least one hydroxyl group and a dielectric constant at 25° C. of from 7 to 10.3; (d) the monoamine compound present in an amount of from 0.7% to 1% by weight, wherein the monoamine compound is selected from the alkyl monoamine, the beta-hydroxyl monoamine containing up to 2 hydroxyl groups, or mixtures thereof; and (e) water.

The aqueous coating composition of the present invention may further comprise one or more wetting agents. "Wetting agent" herein refers to a chemical additive that reduces the surface tension of a coating composition, causing the coating composition to more easily spread across or penetrate the surface of a substrate. Wetting agents may be polycarboxylates, anionic, zwitterionic, or non-ionic. When present, the concentration of the wetting agent may be, by weight based on the total weight of the coating composition, from 0.1% to 2.5%, from 0.5% to 2%, or from 1% to 1.5%.

The aqueous coating composition of the present invention may further comprise one or more defoamers. "Defoamer" herein refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. When present, the concentration of the defoamer may be, by weight based on the total weight of the coating composition, generally from 0.01% to 1%, from 0.05% to 0.8%, or from 0.1% to 0.5%.

The aqueous coating composition of the present invention may further comprise water. The concentration of water may be, by weight based on the total weight of the aqueous coating composition, from 30% to 90%, from 40% to 80%, or from 60% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, plasticizers, leveling agents, dispersants, thixotropic agents, adhesion promoters, and grind vehicles. When present, these additives may be present in a combined amount of from 0.001% to 10% by weight, or from 0.01% to 2% by weight, based on the total weight of the aqueous coating composition.

The coating composition of the present invention may be prepared with techniques known in the coating art. The process of preparing the aqueous coating composition of the present invention may comprise by admixing the aqueous polymer dispersion, the anionic colloidal silica, the solvent, the monoamine compound and water. Other optional components may also be added as described above. Components in the aqueous coating composition may be mixed in any order to provide the aqueous coating composition of the present invention. Any of the above-mentioned optional components may also be added to the composition during or prior to the mixing to form the aqueous coating composition.

In some preferred embodiments, the aqueous coating composition of the present invention has, based on the total weight of the coating composition, less than 90 grams of volatile organic components (VOC) per liter (g/L) of the coating composition according to the GBT 23986-2009 method. In some embodiments, the VOC content of the coating composition is less than 85 g/L or even less than 80 g/L.

The present invention also provides a method of imparting both low gloss and high clarity to a substrate. The method comprises: forming the aqueous coating composition, applying the aqueous coating composition to a substrate, and drying the applied coating composition to form the coating. "High gloss" means a gloss level of 20 or less on a 60° Gardner Gloss scale, and "high clarity" means a clarity value of 40% or higher; according to the test methods described in the Examples section below. The coating obtained therefrom, i.e., the coating film after drying the coating composition applied to the substrate, has the low gloss and the high clarity. The method of preparing the coating may comprise: forming the aqueous coating composition of the present invention, applying the aqueous coating composition to a substrate, and drying the applied coating composition to form the coating.

The process of using the aqueous coating composition of the present invention may comprise the following: applying the coating composition to a substrate, and drying the applied coating composition. The coating composition of the present invention can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition may be dried, or be allowed to dry, at room temperature (21-25° C.), or at an elevated temperature, for example, from 35° C. to 60° C. to form a film (this is, coating).

Figure 2:
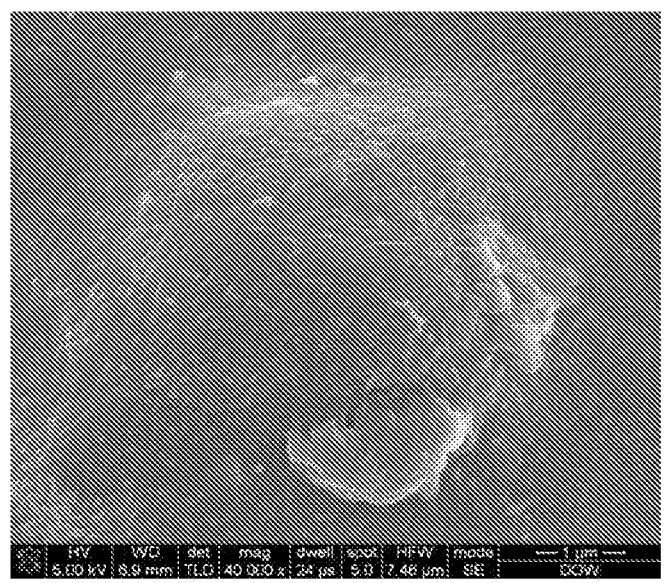
FIG. 2 is a scan electron microscopy (SEM) image of the surface of coating films obtained from one embodiment of a coating composition described herein.
Figure 3:
FIG. 3 is an optical microscopy image (reflective mode) of the surface of coating films obtained from a comparative coating composition.
Figure 4:
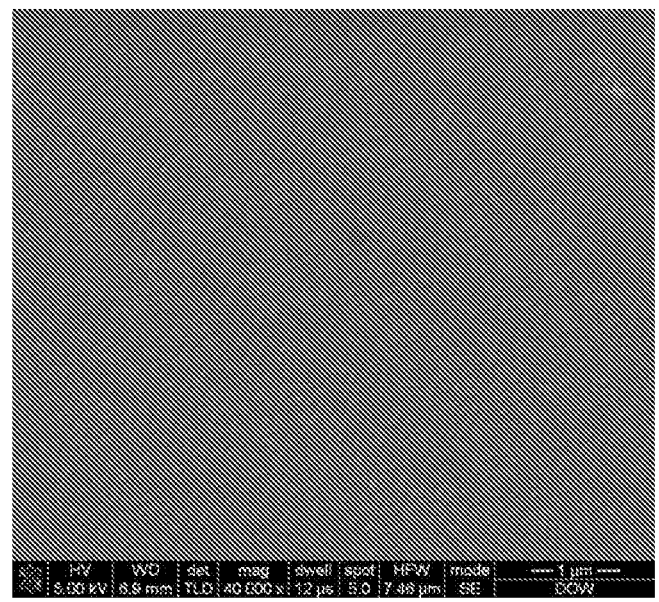
FIG. 4 is a SEM image of the surface of coating films obtained from a comparative coating composition.

The aqueous coating composition of the present invention can be applied to, and adhered to, various substrates. Examples of suitable substrates include wood, metals, plastics, foams, stones, elastomeric substrates, glass, fabrics, concrete, or cementious substrates. The coating composition is suitable for various coating applications, such as marine and protective coatings, automotive coatings, wood coatings, coil coatings, plastic coatings, powder coatings, can coatings, and civil engineering coatings. The aqueous coating composition is particularly suitable for industrial coatings. The aqueous coating composition can be used alone, or in combination with other coatings to form multi-layer coatings. FIG. 1 is an optical microscopy image (reflective mode) of the surface of coating films obtained from one embodiment of a coating composition of the present invention. FIG. 2 is a SEM image of the surface of coating films obtained from one embodiment of a coating composition of the present invention. FIG. 3 is an optical microscopy image (reflective mode) of the surface of coating films obtained from a coating composition of Comparative Example D described below. FIG. 4 is a SEM image of the surface of coating films obtained from the coating composition of Comparative Example D.

Examples

Some embodiments of the invention will now be described in the following Examples, wherein all parts and percentages are by weight unless otherwise specified. The following materials are used in the examples:

2-ethylhexyl acrylate ("2-EHA"), methyl methacrylate ("MMA"), styrene ("ST"), hydroxyethyl acrylate ("HEMA"), methacrylic acid ("MAA"), ammonium persulfate ("APS"), methyl 3-mercaptopropionate ("MMP"), butyl acrylate ("BA"), phosphoethyl methacrylate acid ("PEM") and ammonium hydroxide (25%) (NH$_4$OH) are all available from Sinoreagent Group.

SILQUEST A-174 ("A-174") silane, available from Momentive Performance Materials Holdings LLC, is γ-methacryloxypropyl-trimethoxysilane.

Diacetone acrylamide ("DAAM") and adipic acid dihydrazide ("ADH") are both available from KH Neochem Co., Ltd.

POLYSTEP P-12A surfactant ("P-12A"), available from Stepan, is polyethylene glycol tridecyl ether phosphate ammonium salt, the major component of which has the structure of $C_{13}$(OCH$_2$CH$_2$)$_6$OPO$_3$(NH$_4$)$_2$.

SIPOMER COPS-3 ("COPS-3"), available from Solvay, is an allyl ether phosphate ammonium salt.

DISPONIL™ Fes-32 surfactant ("Fes-32"), available from BASF, is a sodium salt of fatty alcohol ether sulphate.

PRIMAL EP-6060 emulsion ("EP-6060"), available from The Dow Chemical Company, is a styrene acrylic copolymer emulsion.

A polyurethane-acrylic hybrid emulsion (hereinafter "PUA emulsion"), available from The Dow Chemical Company, is a polyurethane-acrylic hybrid emulsion having an acrylic polymer to polyurethane weight ratio of 90/10.

ACEMATT™ TS-100 ("TS-100") matting agent, available from Evonik, is fumed silica powder having an average particle size of 9.5 microns.

DEUTERON™ MK ("MK") matting agent, available from Deuteron, is based on polyurea powder having an average particle size of 6.3 microns.

DYNOL™ 360 wetting agent is available from Air Product.

ACRYSOL™ DR-180 ("DR-180"), available from The Dow Chemical Company, is a hydrophobically modified, alkalisoluble, anionic associative thickener.

Solvents all available from The Dow Chemical Company are described below.

| Solvent | Dielectric Constant | Chemical Name |
|---|---|---|
| DOWANOL PM | 11.97 | Propylene Glycol Methyl Ether ("PM") |
| DOWANOL DPM | 10.44 | Dipropylene Glycol Methyl Ether ("DPM") |
| DOWANOL PMA | 8.04 | Propylene Glycol Methyl Ether Acetate ("PMA") |
| DOWANOL PnP | 8.82 | Propylene Glycol n-Propyl Ether ("PnP") |
| DOWANOL DPnP | 8.48 | Dipropylene Glycol n-Propyl Ether ("DPnP") |
| DOWANOL PnB | 7.97 | Propylene Glycol n-Butyl Ether ("PnB") |
| DOWANOL DPnB | 7.76 | Dipropylene Glycol n-Butyl Ether ("DPnB") |
| Methyl CARBITOL | 14.81 | Diethylene Glycol Monomethyl Ether ("DM") |
| Butyl CARBITOL | 10.15 | Diethylene Glycol Monobutyl Ether ("DB") |
| Butyl CELLOSOLVE | 9.36 | Ethylene Glycol Monobutyl Ether ("EB") |
| Hexyl CELLOSOLVE | 7.38 | Ethylene Glycol Monohexyl Ether |
| Butoxytriglycol | 9.64 | Triethylene Glycol Monobutyl Ether |

AMP™-95, available from The Dow Chemical Company, is 2-amino-2-methyl-1-propanol (AMP is a trademark of The Dow Chemical Company).

Monoethanolamine ("MEA"), aminopropanol, aminobutanol, n-butylamine, tris(hydroxymethyl)aminomethane, isophorone diamine ("IPDA"), N,N'-diethyl-1,3-propanediamine, and 2-(2-aminoethylamino)ethanol are all available from Sinoreagent Group.

JEFFAMINE™ D203 polyetheramine, available from Huntsman, is a polyether diamine.

Colloidal silica used in the examples are described below.

| Colloidal Silica | Description | Solids | Particle size | Specific surface area | pH | Supplier |
|---|---|---|---|---|---|---|
| BINDZIL 2040 | amorphous SiO$_2$ | 40% | 15 nm | 200 m$^2$/g | 10 | Akzo |
| BINDZIL 215 | amorphous SiO$_2$ | 15% | 4.5 nm | 650 m$^2$/g | 11 | Nobel |
| BINDZIL 40/130 | amorphous SiO$_2$ | 40% | 22 nm | 130 m$^2$/g | 9.1 | |
| LUDOX AS40 | amorphous SiO$_2$ | 40% | 22 nm | 140 m$^2$/g | 9.1 | W. R. |
| LUDOX TMA | Surface modified SiO$_2$ | 34% | 22 nm | 140 m$^2$/g | 4-7 | Grace & |
| LUDOX TMA silane | SiO$_2$ surface modified with silane | 35% | 22 nm | 140 m$^2$/g | 4-7 | Co. |

The following standard analytical equipment and methods are used in the Examples.

Average Particle Size and Specific Surface Area of Colloidal Silica

Average particle size and specific surface area of colloidal silica are determined according to the HG/T 2521-2008 method. One and half (1.50) grams (g) of colloidal silica are mixed with 100 g of deionized (DI) water in a beaker. The pH value of the resulting dispersion is adjusted to 3~3.5 with HCl or NaOH solutions. 30 g of NaCl are further added into the obtained dispersion, followed by adding DI water to adjust the dispersion volume to 150 ml and to fully dissolve NaCl. The obtained dispersion is then titrated using a standard NaOH solution (about 0.1 mol/L). The accurate concentration of the standard NaOH used in the test is recorded and denoted as c. The volume of NaOH standard solution used for pH shifting from 4.00~9.00 is recoded and denoted as V.

The average particle size in nanometer, denoted as D, is determined by:

$$D=2727/(320Vc-25)$$

The specific surface area of colloidal silica, denoted as SA, is determined by:

$$SA=320Vc-25.$$

Gloss

The gloss of coating films is measured according to the ASTM D523 method using a BYK Micro-Tri-Gloss meter.

Stability

An aqueous coating compositions is formulated at room temperature and then stored at room temperature for 14 days. If no grits are observed by the naked eye during drawdown applications, the coating composition has good stability. If grits are observed, the coating composition has poor stability.

Clarity

A coating composition is coated on a glass plate to form a 120 microns thick wet film using a drawdown applicator, then is cured in an oven at 50° C. for 48 hours to form a panel. A BYK haze-gard dual haze meter is used to evaluate the clarity of the obtained coating film. Clarity is calculated using the following equation:

$$\text{Clarity=Transmittance}*(1-\text{Haze})$$

The clarity of the glass plate before applying the coating composition is denoted as $C_{glass}$. The clarity of the panel is denoted as $C_{glass+film}$. The clarity of the coating film is measured according to the following equation:

$$\text{Clarity of the coating film}=C_{glass+film}/C_{glass}\times 100\%$$

A clarity value of at least 40% for the coating film is acceptable for wood coatings. The higher the clarity value, the better clarity.

Preparation of Aqueous Dispersion BX12-20

Preparation of Monomer Emulsion 1: P-12A surfactant (15.98 g, 24.66% active) was dissolved in deioned (DI) water (222.38 g) with stirring. Then 2-EHA (334.82 g), MMA (147.78 g), ST (147.78 g), HEMA (13.10 g), MAA (13.3 g) and A-174 (6.53 g) were slowly added into the resulting surfactant solution to obtain Monomer Emulsion 1.

Preparation of Monomer Emulsion 2: P-12A surfactant (15.98 g, 24.66% active) was dissolved in DI water (189.8 g) with stirring. Then 2-EHA (163.48 g), MMA (228.88 g), ST (228.88 g), DAAM (19.7 g), MAA (13.1 g), and A-174 (6.53 g) were added into the resultant surfactant solution to obtain Monomer Emulsion 2.

A solution containing P-12A surfactant (26.52 g, 24.66% active), COPS-3 (32.80 g, 40% active) and DI water (773.88 g) was added into a 4-neck, 5 liter round bottom flask equipped with a thermocouple, a cooling condenser and an agitator, and was heated to 85° C. under nitrogen atmosphere. An aqueous sodium carbonate solution (2.0 g sodium carbonate in 56 g DI water), an aqueous APS initiator solution (2.0 g APS in 22 g DI water), and 4.7% by weight of Monomer Emulsion 1 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 1 was added gradually to the flask over a period of 90 minutes with stirring, and the temperature was maintained at 79-81° C. Monomer Emulsion 2 obtained above was then added into the flask in the same manner as Monomer Emulsion 1 over 90 minutes. Upon completing addition, the reaction mixture was held at 70° C. for 60 minutes, then cooled down to 50° C. and neutralized to a pH value of 7.0-8.0 by a 30% aqueous ammonia solution. The obtained mixture was held at 45-50° C. for 10 minutes. Then ADH slurry (19.7 g, 40% active in water) was post-added into the flask over 10 minutes. The resultant mixture was cooled down to room temperature to obtain the aqueous dispersion BX12-20 (solids: 43.82%, pH: 7.44, calculated $T_g$: −1.4° C.).

Preparation of Aqueous Dispersion XY04-59

Preparation of Monomer Emulsion 1: Fes-32 surfactant (7.44 g, 31% active) was dissolved in DI water (162.54 g) with stirring. Then MMA (359.45 g), MAA (28.63 g), PEM (13.27 g), DAAM (14.52 g) and MMP (8.21 g) were slowly added into the resulting surfactant solution to obtain Monomer Emulsion 1.

Preparation of Monomer Emulsion 2: Fes-32 surfactant (3.72 g, 31% by weight of solids) was dissolved in DI water (166 g) with stirring. Then 2-EHA (237.58 g), BA (168.80 g), MMA (199.46 g) and DAAM (18.66 g) were added into the resultant surfactant solution to obtain Monomer Emulsion 2.

A solution containing Fes-32 surfactant (1.24 g, 31% active) and DI water (617.57 g) was added into a 4-neck, 5 liter round bottom flask equipped with a thermocouple, a cooling condenser and an agitator, and was heated to 85° C. under nitrogen atmosphere. An aqueous APS initiator solution (2.01 g APS in 38.07 g DI water), and 4.0% by weight of Monomer Emulsion 1 obtained above were then added into the flask. Within about 5 minutes, initiation of polymerization was confirmed by a temperature increase by 3° C. and a change of the external appearance of the reaction mixture. After heat generation stopped, the remaining Monomer Emulsion 1 was added gradually to the flask over a period of 40 minutes with stirring, and an aqueous APS initiator solution (1.27 g APS in 60.23 g DI water) was added gradually to the flask over a period of 50 minutes, and the temperature was maintained at 84-86° C. After Monomer Emulsion 1 and initiator solution were consumed, the reaction mixture was held for 30 minutes. An aqueous ammonia solution (80 g, 12.5% active) was added into the reactor over 15 minutes. The reaction mixture was held for 20 minutes. The obtained oligomer was dissolved or partially dissolved. Monomer Emulsion 2 obtained above was then added into the flask in the same manner as Monomer Emulsion 1 over 60 minutes, and an aqueous APS initiator solution (1.52 g APS in 72.28 g DI water) was added gradually to the flask over a period of 60 minutes. Upon completing addition, the reaction mixture was held at 80° C. for 30 minutes, then cooled down to 50° C. Then ADH slurry (52.15 g, 40% active in water) was post-added into the flask over 10 minutes. The resultant mixture was cooled down to room temperature to obtain the aqueous dispersion XY04-59 (solids: 42.13% by weight, pH: 9.28, calculated $T_g$: 27.2° C.).

Examples (Exs) 1-17

Coating compositions of Exs 1-17 and Comp Exs A-D were prepared based on formulations described in Tables 1 and 2. Ingredients listed in Tables 1 and 2, respectively, were mixed using a conventional lab mixer. The obtained coating compositions were coated on a substrate, and then evaluated according to the test methods described above. Properties of the obtained films were shown in Tables 1 and 2.
Comparative (Comp) Exs A-U Coating Composition Coating compositions of Comp Exs A-U were prepared substantially the same as Exs 1-17, based on formulations described in Tables 3-5. Properties of the obtained coating films were also shown in Tables 3-5.

Tables 1 and 2 show coating compositions of Exs 1-17 and properties of the obtained coating films. As shown in Tables 1 and 2, coating compositions of the present invention provided coating films with both low gloss (a gloss at 60° of 20 or less) and high clarity (at least 40%). All coating compositions of Exs 1-17 demonstrated good stability.

Table 3 shows coating compositions of Comp Exs A-G and properties of the obtained coating films. As shown in Table 3, coating compositions of Comp Exs A-C comprising solvents selected from DPM, PMA, and DM, respectively, provided obtained coating films with undesirably high gloss. Coating compositions comprising surface modified colloidal silica (Comp Exs D-G) also provided coating films with undesirably high gloss.

FIGS. 1 and 2 show the surface optical microscope (reflective mode) and SEM image of coating films obtained from the coating composition of Ex 1, respectively. As shown in FIGS. 1 and 2, the images show that silica particles agglomerated in the coating films. The agglomerates of the silica particles are micro-scale structure. Without being bound by a particular theory, it is believed that the aggregated colloidal silica particles may act as a matting agent. FIGS. 3 and 4 show the surface optical microscope (reflective mode) and SEM image of coating films obtained from the comparative coating composition of Comp Ex D, respectively. In contrast, silica particles were well dispersed in the coating films and no agglomerated micro-scale particles were observed as shown in FIGS. 3 and 4.

TABLE 1

Aqueous coating composition, gram

|  |  | Ex 1 | Ex 2 | Ex 3 | Ex 4 | Ex 5 | Ex 6 | Ex 7 | Ex 8 |
|---|---|---|---|---|---|---|---|---|---|
| Acrylic emulsion | BX12-20 | 76.4 | 76.4 |  |  |  |  |  |  |
|  | XY04-59 |  |  | 85 | 85 | 85 | 85 | 85 | 85 |
| Colloidal silica | BINDZIL 2040 | 23.6 | 23.6 |  |  |  |  |  |  |
|  | BINDZIL 215 |  |  | 20 | 15 | 15 | 25 | 25 | 20 |
| Solvent | DB | 2 |  |  |  |  |  |  |  |
|  | EB |  | 2 |  |  |  |  |  |  |
|  | DM | 1 | 1 | 1 |  |  |  |  | 1 |
|  | PnB |  |  |  | 10 |  |  |  |  |
|  | Butoxytriglycol |  |  |  |  |  |  | 6 |  |
|  | PnP |  |  |  |  |  | 10 |  |  |
|  | DPnP |  |  |  |  | 6 |  |  |  |
|  | Hexyl CELLOSOLVE |  |  |  |  |  |  |  | 4 |
|  | DPnB |  |  | 3 |  |  |  |  |  |
| Amine | AMP-95 | 0.5 | 0.5 | 1 | 1.5 | 1 | 2 | 1 | 1.5 |
| Water |  | 20 | 20 | 20 |  |  |  |  |  |
| Thickener | DR-180 | 1.5 | 1.5 | 0.3 | 0.3 | 0.3 | 0.3 | 0.3 | 0.3 |
| Properties of coating film |  |  |  |  |  |  |  |  |  |
| Gloss (60°) |  | 6 | 11.4 | 20 | 19.5 | 7.5 | 20 | 16.1 | 20 |
| Clarity, % |  | 63.40 | 58.86 | 87.23 | 82.00 | 82.32 | 88.28 | 78.74 | 84.58 |

TABLE 2

Aqueous coating composition, gram

|  |  | Ex 9 | Ex 10 | Ex 11 | Ex 12 | Ex 13 | Ex 14 | Ex 15 | Ex 16 | Ex 17 |
|---|---|---|---|---|---|---|---|---|---|---|
| Acrylic emulsion | XY04-59 |  |  | 85 |  | 85 |  |  |  |  |
|  | BX12-20 | 76.4 | 76.4 |  | 76.4 |  | 76.4 | 76.4 |  |  |
|  | EP-6060 |  |  |  |  |  |  |  | 84.4 | 84.4 |
| Colloidal silica | BINDZIL 2040 |  |  |  | 23.6 |  | 23.6 | 23.6 | 23.6 | 47.2 |
|  | BINDZIL 215 |  |  | 15 |  | 14 |  |  |  |  |
|  | LUDOX AS40 | 47.2 |  |  |  |  |  |  |  |  |
|  | BINDZIL 40/130 |  | 47.2 |  |  |  |  |  |  |  |

TABLE 2-continued

| | | Ex 9 | Ex 10 | Ex 11 | Ex 12 | Ex 13 | Ex 14 | Ex 15 | Ex 16 | Ex 17 |
|---|---|---|---|---|---|---|---|---|---|---|
| Aqueous coating composition, gram | | | | | | | | | | |
| Solvent | DB | 2 | 2 | 4 | 2 | 4 | | | 6.4 | 6.4 |
| | EB | | | 2 | | 2 | | | | |
| | DM | 1 | 1 | | 1 | | 1 | 1 | 1 | 1 |
| | DPnP | | | | | | 6 | | | |
| | PnP | | | | | | | 6 | | |
| Amine | AMP-95 | 0.5 | 0.5 | 1 | | | 0.5 | 0.5 | 0.5 | 0.5 |
| | n-butylamine | | | | 0.5 | | | | | |
| | MEA | | | | | 1 | | | | |
| Water | | 20 | 20 | | 20 | 0 | 20 | 20 | 35 | 35 |
| Thickener | DR-180 | 1.5 | 1.5 | 0.3 | 1.5 | 0.3 | 1.5 | 1.5 | 1.5 | 1.5 |
| Properties of coating film | | | | | | | | | | |
| Gloss (60°) | | 5.2 | 11 | 10.8 | 18.1 | 16.4 | 7.5 | 8.8 | 17.8 | 7.5 |
| Clarity, % | | 48.05 | 69.16 | 65.54 | 74.77 | 80.21 | 49.57 | 51.48 | 84.43 | 72.28 |

TABLE 3

| | | Comp Ex A | Comp Ex B | Comp Ex C | Comp Ex D | Comp Ex E | Comp Ex F | Comp Ex G |
|---|---|---|---|---|---|---|---|---|
| Comparative aqueous coating composition, gram | | | | | | | | |
| Acrylic emulsion | BX12-20 | 76.4 | 76.4 | 76.4 | 76.4 | 76.4 | 76.4 | 76.4 |
| Colloidal silica | BINDZIL 2040 | 23.6 | 23.6 | 23.6 | | | | |
| | LUDOX TMA | | | | 27.8 | 55.5 | | |
| | LUDOX TMA silane | | | | | | 27 | 54 |
| Solvent | DB | | | | 2 | 2 | 2 | 2 |
| | DPM | 6 | | | | | | |
| | PMA | | 6 | | | | | |
| | DM | | | 6 | 1 | 1 | 1 | 1 |
| Amine | AMP-95 | 0.5 | 0.5 | 0.5 | 0.5 | 0.5 | 0.5 | 0.5 |
| Water | | 20 | 20 | 20 | 20 | 20 | 20 | 20 |
| Thickener | DR-180 | 1.5 | 1.5 | 1.5 | 1.5 | 1.5 | 1.5 | 1.5 |
| Properties of coating film | | | | | | | | |
| Gloss (60°) | | 53.8 | 49.1 | 78.4 | 54.9 | 52.5 | 38.7 | 38.7 |
| Clarity, % | | n/a | n/a | n/a | 98.49 | 91.96 | 75.05 | 75.05 |

Table 4 shows coating compositions of Comp Exs H-O and properties of the obtained coating films. As shown in Table 4, coating compositions comprising no amines (Comp Ex H), an amine compound containing three hydroxyl groups (Comp Ex I), or 2-(2-aminoethylamino)ethanol (Comp Ex J) provided coating films with undesirably high gloss. Coating compositions containing diamines gelled at room temperature after mixing for 30 minutes (Comp Exs K, L and M). Coating compositions comprising gama-hydroxyl amine (Comp Ex N) or delta-hydroxyl amine (Comp Ex O) provided coating films with undesirably low clarity.

TABLE 4

| | | Comp Ex H | Comp Ex I | Comp Ex J | Comp Ex K | Comp Ex L | Comp Ex M | Comp Ex N | Comp Ex O |
|---|---|---|---|---|---|---|---|---|---|
| Comparative aqueous coating composition, gram | | | | | | | | | |
| Acrylic emulsion | BX12-20 | 76.4 | 76.4 | 76.4 | 76.4 | 76.4 | 76.4 | 76.4 | 76.4 |
| | XY04-59 | | | | | | | | |
| Colloidal silica | BINDZIL 2040 | 23.6 | 23.6 | 23.6 | 23.6 | 23.6 | 23.6 | 23.6 | 23.6 |
| | BINDZIL 215 | | | | | | | | |
| Solvent | DB | 2 | 2 | 2 | 2 | 2 | 2 | 2 | 2 |
| | EB | | | | | | | | |

TABLE 4-continued

Comparative aqueous coating composition, gram

|  |  | Comp Ex H | Comp Ex I | Comp Ex J | Comp Ex K | Comp Ex L | Comp Ex M | Comp Ex N | Comp Ex O |
|---|---|---|---|---|---|---|---|---|---|
|  | DM | 1 | 1 | 1 | 1 | 1 | 1 | 1 | 1 |
|  | PM | 4 |  |  |  |  |  |  |  |
| Amine | JEFFAMINE D203 |  |  |  | 0.5 |  |  |  |  |
|  | IPDA |  |  |  |  |  |  | 0.5 |  |
|  | N,N'-Diethyl-1,3-propanediamine |  |  |  |  | 0.5 |  |  |  |
|  | 2-(2-Aminoethylamino)ethanol |  |  | 0.5 |  |  |  |  |  |
|  | Aminopropanol |  |  |  |  |  |  | 0.5 |  |
|  | Aminobutanol |  |  |  |  |  |  |  | 0.5 |
|  | Tris(hydroxymethyl)aminomethane |  | 1.25 |  |  |  |  |  |  |
| Water |  | 20 | 20 | 20 | 20 | 20 | 20 | 20 | 20 |
| Thickener | DR-180 | 1.5 | 1.5 | 1.5 | 1.5 | 1.5 | 1.5 | 1.5 | 1.5 |
|  |  | Properties of coating film |  |  |  |  |  |  |  |
|  | Gloss (60°) | 70.5 | 49.5 | 68.7 | gel | gel | gel | 5.1 | 5 |
|  | Clarity, % | n/a | n/a | n/a | n/a | n/a | n/a | 25.57 | 31.70 |

Table 5 shows coating compositions of Comp Exs P-U and properties of the obtained coating films. As shown in Table 5, the coating composition of Comp Ex P comprising about 2% by weight of amine, based on the total weight of the coating composition, provided coating films with undesirably high gloss. Coating compositions containing no amine (Comp Exs Q and R) offered coating films with undesirably high gloss. Coating films obtained from coating compositions comprising conventional matting agents (Comp Exs T and U) showed undesirably low clarity. The coating composition comprising polyurethane-acrylic (10:90) hybrid dispersion (Comp Ex S) showed many visible grit particles after storage at room temperature for only 30 minutes, which indicates that the coating composition of Comp Ex S had poor stability.

TABLE 5

Comparative aqueous coating composition, gram

|  |  | Comp Ex P | Comp Ex Q | Comp Ex R | Comp Ex S | Comp Ex T | Comp Ex U |
|---|---|---|---|---|---|---|---|
| Acrylic emulsion | BX12-20 | 76.4 | 76.4 | 76.4 |  | 72.6 | 72.6 |
|  | PUA emulsion |  |  |  | 76.2 |  |  |
| Colloidal silica | BINDZIL 2040 | 23.6 | 23.6 | 23.6 | 47.2 |  |  |
| Solvent | DPnP |  | 6 |  |  |  |  |
|  | PnP |  |  | 6 |  |  |  |
|  | DM |  | 1 | 1 | 1 | 1 | 1 |
|  | EB | 3 |  |  |  |  |  |
|  | DPnB |  |  |  |  | 2.5 | 2.5 |
|  | DB |  |  |  | 3 |  |  |
| Amine | AMP-95 | 2.5 |  |  | 0.5 |  |  |
| Water |  | 20 | 20 | 20 | 20 | 23 | 23 |
| Thickener | DR-180 |  | 1.5 | 1.5 | 1.5 | 0.5 | 0.5 |
| Matting agent | MK |  |  |  |  | 5 |  |
|  | TS-100 |  |  |  |  |  | 3.2 |
| Wetting agent | DYNOL 360 |  |  |  |  |  | 1.5 |
|  |  | Properties of coating film |  |  |  |  |  |
|  | Gloss (60°) | 55.9 | 35.4 | 48.5 | n/a | 4.1 | 9.4 |
|  | Clarity, % | n/a | 99.79 | 87.74 | n/a | 18.16 | 39 |

Comp Ex V

Comp Ex V was prepared substantially the same as described in CN102190936A. Ten grams of BINDZIL 2040 colloidal silica, 0.5 g of SILQUEST™ A-187 epoxy functional silane available from Momentive Performance Materials Holdings LLC., and 3 g of DB were mixed with a high speed disperser at room temperature. The resulting composition showed many visible grit particles after storage at room temperature for only 30 minutes and was not suitable for coating applications.

What is claimed is:

1. An aqueous coating composition comprising, based on the total weight of the aqueous coating composition,
   (a) an aqueous polymer dispersion present in an amount of from 15% to 33% by solids weight, wherein the polymer comprises at least 95% by solids weight of an acrylic emulsion copolymer based on the solids weight of the polymer;

(b) anionic colloidal silica present in an amount of from 1% to 13% by solids weight;

(c) a solvent present in an amount of from 0.5% to 9% by weight, wherein the solvent has at least one hydroxyl group and a dielectric constant at 25° C. of from 7 to 10.3, and is at least one of diethylene glycol monobutyl ether, ethylene glycol monobutyl ether, ethylene glycol monohexyl ether, triethylene glycol monobutyl ether, dipropylene glycol n-butyl ether, propylene glycol n-butyl ether, dipropylene glycol n-propyl ether, propylene glycol n-propyl ether, or diethylene glycol monomethyl ether;

(d) a monoamine compound present in an amount of from 0.2% to 1.5% by weight, wherein the monoamine compound is selected from an alkyl monoamine, a beta-hydroxyl monoamine containing up to 2 hydroxyl groups, or mixtures thereof; and (e) water;

wherein the aqueous coating composition is substantially free of silane coupling agents.

2. The aqueous coating composition of claim 1, wherein the monoamine compound is a primary monoamine.

3. The aqueous coating composition of claim 1, wherein the monoamine compound is selected from n-butylamine, 2-amino-2-methyl-1-propanol, or mixtures thereof.

4. The aqueous coating composition of claim 1, wherein the monoamine compound is present in an amount of from 0.5% to 1.2% by weight, based on the total weight of the aqueous coating composition.

5. The aqueous coating composition of claim 1, wherein the anionic colloidal silica has a pH value >8.5.

6. The aqueous coating composition of claim 1, wherein silica particles in the anionic colloidal silica have a specific surface area of from 20 to 800 $m^2/g$.

7. The aqueous coating composition of claim 1, wherein the anionic colloidal silica is present in an amount of from 1.5% to 11% by solids weight, based on the total weight of the aqueous coating composition.

8. The aqueous coating composition of claim 1, wherein the solvent is present in an amount of from 1% to 7% by weight based on the total weight of the aqueous coating composition.

9. The aqueous coating composition of claim 1, wherein the acrylic emulsion copolymer has a glass transition temperature of from 0° C. to 40° C.

10. The aqueous coating composition of claim 1, being substantially free of microfillers.

11. An aqueous coating composition comprising, based on the total weight of the aqueous coating composition, (a) an aqueous polymer dispersion present in an amount of from 18% to 31% by solids weight, wherein the polymer comprises at least 95% by solids weight of an acrylic emulsion copolymer based on the solids weight of the polymer;

(b) anionic colloidal silica present in an amount of from 1.5% to 11% by solids weight, wherein silica particles in the anionic colloidal silica have a specific surface area of from 80 to 500 $m^2/g$;

(c) a solvent present in an amount of from 1% to 4% by weight, wherein the solvent has at least one hydroxyl group and a dielectric constant at 25° C. of from 7 to 10.3, and is at least one of diethylene glycol monobutyl ether, ethylene glycol monobutyl ether, ethylene glycol monohexyl ether, triethylene glycol monobutyl ether, dipropylene glycol n-butyl ether, propylene glycol n-butyl ether, dipropylene glycol n-propyl ether, propylene glycol n-propyl ether, or diethylene glycol monomethyl ether;

(d) a monoamine compound present in an amount of from 0.7% to 1% by weight, wherein the monoamine is selected from an alkyl monoamine, a beta-hydroxyl monoamine containing up to 2 hydroxyl groups, or mixtures thereof; and (e) water;

wherein the aqueous coating composition is substantially free of silane coupling agents.

12. A process of preparing the aqueous coating composition of claim 1, comprising: admixing
   (a) the aqueous polymer dispersion,
   (b) the anionic colloidal silica,
   (c) the solvent,
   (d) the monoamine compound, and
   (e) water.

13. A method of imparting both low gloss and high clarity to a substrate comprising:
   forming the aqueous coating composition of claim 1,
   applying the aqueous coating composition to a substrate, and
   drying the applied coating composition to form a coating; wherein the coating has a gloss level of 20 or less on a 60° Gardner Gloss scale and a clarity value of 40% or higher.

* * * * *